J. M. HANSEN.
MANUFACTURE OF CAR WHEELS.
APPLICATION FILED JUNE 4, 1910.
1,170,533.
Patented Feb. 8, 1916.
2 SHEETS—SHEET 1.
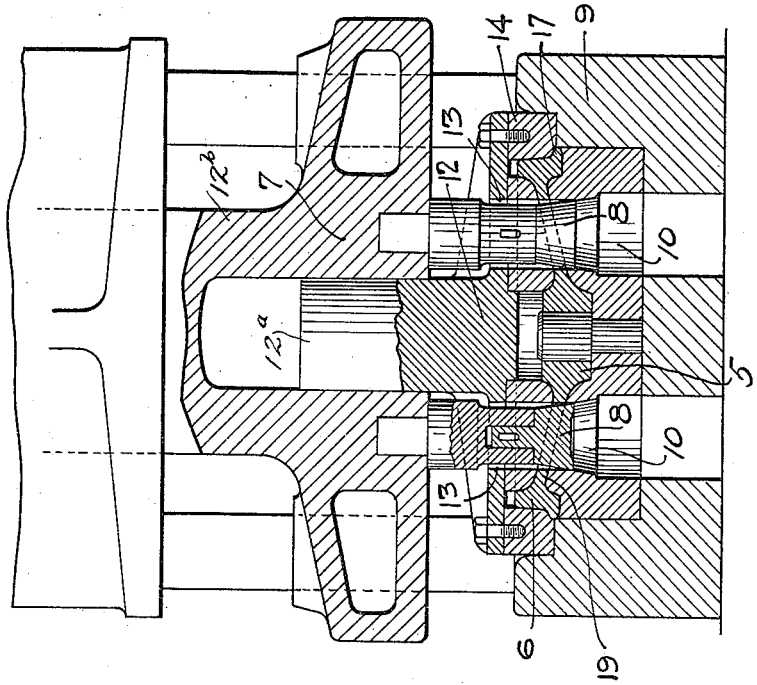
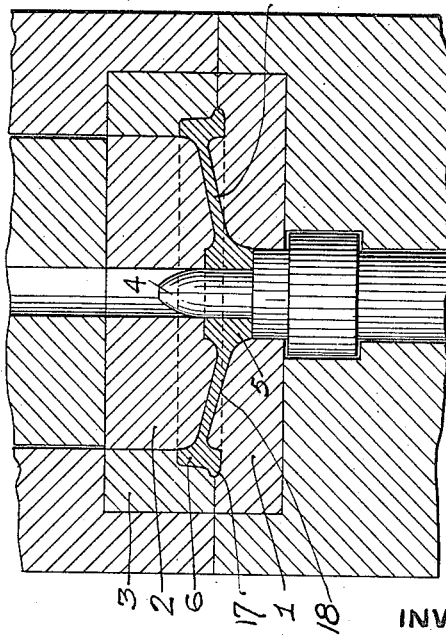
WITNESSES.
J. R. Keller
Robt. C. Totten
INVENTOR.
John M. Hansen
By Kay & Totten
Attorneys J. M. HANSEN.
MANUFACTURE OF CAR WHEELS.
APPLICATION FILED JUNE 4, 1910.
1,170,533.
Patented Feb. 8, 1916.
2 SHEETS—SHEET 2.
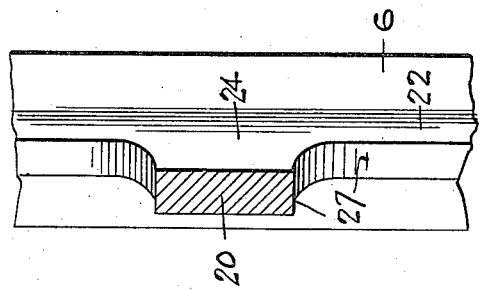
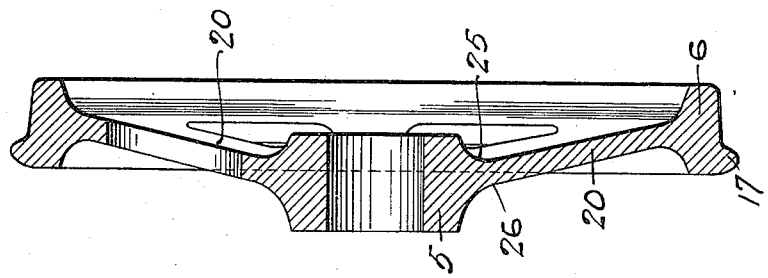
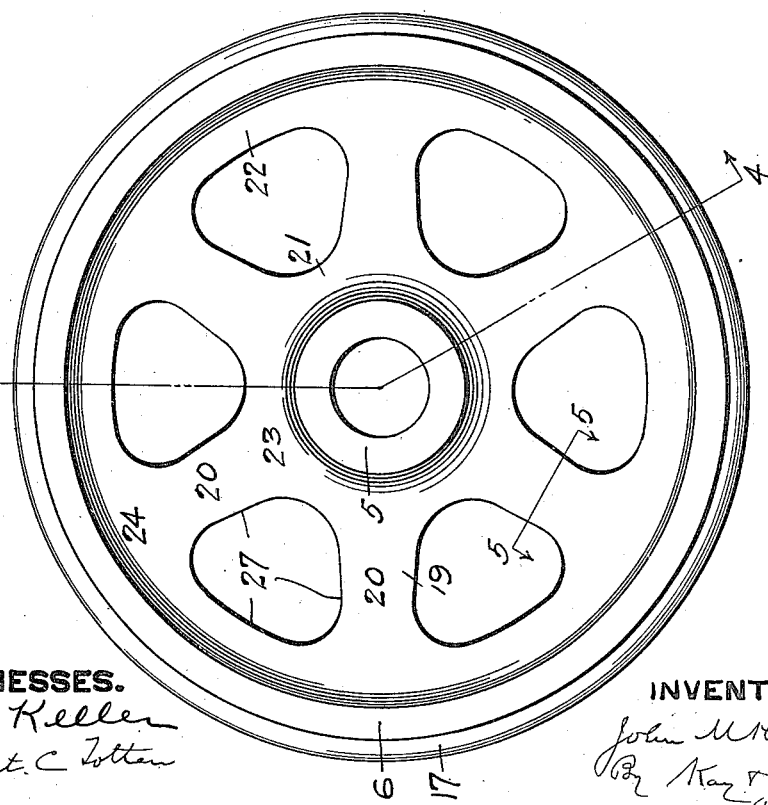
WITNESSES.
INVENTOR.

UNITED STATES PATENT OFFICE.

JOHN M. HANSEN, OF PITTSBURGH, PENNSYLVANIA, ASSIGNOR TO FORGED STEEL WHEEL COMPANY, OF PITTSBURGH, PENNSYLVANIA, A CORPORATION OF PENNSYLVANIA.

MANUFACTURE OF CAR-WHEELS.

1,170,533.  Specification of Letters Patent.  Patented Feb. 8, 1916.

Application filed June 4, 1910. Serial No. 565,025.

*To all whom it may concern:*

Be it known that I, JOHN M. HANSEN, a resident of Pittsburgh, in the county of Allegheny and State of Pennsylvania, have invented a new and useful Improvement in the Manufacture of Car-Wheels; and I do hereby declare the following to be a full, clear, and exact description thereof.

My invention relates to the manufacture of forged steel car wheels, its object being to provide a forged steel wheel of light weight, such as suitable for steel cars and other cars carrying relatively light loads such as in electric service. As a matter of safety in carrying loads, and for like reasons, it has become very desirable to employ forged steel wheels because of the greater strength of the wheel flanges to resist shocks and jars, and the longer life of the wheels. Another important requirement for forged steel wheels is lightness in weight, as any material reduction in weight produces a like economy in cost of running, it being calculated that in the present service on electric roads a saving of each hundred pounds in weight effects a saving of from five to ten dollars per year. For this class of car wheels it has been found that a wheel with light hub and rim but with sufficient thickness of flange, was very desirable, but great difficulty has been experienced in providing such a wheel with a light weight web of sufficient stiffness. One main reason for this is found in the difficulty of forcing a thin and light web corresponding to the usual proportions of the wheel body, because the metal of the web portion is forged much thinner than the hub and rim and is subjected to very considerably more work, and being thinner than the hub and rim, cools much more rapidly in the forging operation and becomes too stiff for forging if made much thinner than in the standard heavy wheel used for steam railroad service. Another difficulty found is that where the wheel web is thinned in like proportion to the rest of the wheel as compared with the regular section of such heavier forged steel wheel, and the wheel is dished, the web strength and stiffness of the wheel are so impaired as to be brought below the safety limit of wheels of this type. By the present invention I am enabled to produce these wheels rapidly and provide them with a light weight midsection connecting the hub and rim and yet with sufficient stiffness to sustain the desired load.

It consists, generally stated, in forging a wheel with finished hub, rim portion and a flat web portion of the same thickness throughout at equal distances from the wheel axis, and dishing the wheel to bring the hub and web out of line, as in the standard wheel, and then forming spokes connecting the hub and rim of the dished wheel by simultaneously shearing through the web portion along lines parallel to the wheel axis.

In the accompanying drawing Figure 1 is a vertical section of a set of dies suitable for the forging of the wheel; Fig. 2 is a like vertical section of dies suitable for shearing the web portion of the wheel; Fig. 3 is a face view of the wheel; Fig. 4 is a vertical section of the wheel; and Fig. 5 is a section on the line 5—5 Fig. 3.

In the manufacture of the wheels any suitable forging means may be employed, such for example as the forging dies illustrated in Fig. 1, said dies having the anvil die 1, and the reciprocating forging die 2, the ring die 3 and the punch 4. The dies as illustrated can be used either as one-operation dies, producing the wheel from the blank by one forging operation, which at the same time dishes the wheel, drawing the hub 5 out of line with the rim 6, or may be used as finishing dies for the final forging operation. The shearing dies of Fig. 2 have the reciprocating die head 7 carrying the shears 8 and the anvil die 9 of proper contour for the support of the forged wheel and having the shearing openings 10 formed as illustrated with suitable clearance for the dropping of the metal removed from the web of the wheel. In the preferred construction the upper die carries the clamping head 12 fitting upon the blank to confine it during the shearing operation, such clamping die having openings 13 for the passage of the shears 8, as shown. This clamping head is forced downwardly by hydraulic pressure having the plunger $12^a$ working in the cylinder $12^b$. In order to properly brace the wheel rim during such shearing operation I also prefer to employ the ring die 14 which fits into a seat formed in the anvil die 9 and confines the outer face of the wheel rim bearing upon the rim face 6 and flange 17 as shown. This ring may be carried in any suitable way, being illustrated as attached directly to the clamping head 12 and moving therewith, so as to be lowered into position before the shearing operation and withdrawn therewith to give access to the punched wheel.

In the manufacture of the wheel it is subjected to a suitable forging operation or operations producing the forged wheel 18 with finished hub 5, rim 6 and flange 17, and dished web portion 19. This blank can be easily formed with hub and rim of light weight and web of considerable thickness relative to hub and rim, in the preferred manufacture of light weight wheels the web being at least ¾ of an inch thick near the rim, and 1 inch thick near the hub. While the wheel is still at a relatively high heat it is placed upon the anvil 9 and while properly supported thereon it is simultaneously sheared at different points to produce the spokes 20, the shears 8 passing through the web portion 19 on lines parallel to the wheel axis, such shearing operation removing a large portion of the web and forming the spokes connecting the hub and rim.

In the preferred operation the web is sheared so as to leave the narrow continuous web portion 21 extending beyond the hub and the like web portion 22 near the rim, the metal as removed leaving such web portions with the spokes 20 connecting the same, said spokes being wider close to the hub as at 23 and close to the rim as at 24, connecting to hub and rim by curved surfaces as at 25, 26. As illustrated in Fig. 2, as the wheel is forged to dished form as shown, the shears 8 engage with the dished web portion of the wheel first near the outer portion of the web and pass through the same along the inclined web, so providing for a clean cutting along gradual lines through the inclined or dished web portion of the wheel. In such manufacture it will be seen that the hub and rim are forged to finished shape, and that the web is first forged of even face, that is, of the same thickness at equal distances from the wheel axis, and by the shearing operation a large portion, approximately one-half, of the web is removed, forming flat faced spokes 20 with sheared edge faces or shear-finished edge walls 27 parallel to the wheel axis, producing a very strong form of wheel spoke connecting the hub and rim of the wheel. In such manufacture by first forging the web with a relatively thick body, the power necessary for the forging operation is materially reduced, so avoiding the practical difficulties encountered and the power required in forging a very thin web on account of the heavy strain upon the machinery and that caused by the cooling of such relatively thin portion of the wheel body; while by shearing the web while still hot and along lines parallel to the axis and at an incline to the dished web, this operation is made rapid and relatively easy and the necessity of dies of great power for such purpose is overcome. By simultaneously shearing through the web at different points to produce the spokes the shearing is accomplished while the metal of the web is at practically the same temperature throughout and I avoid the setting up of strains in the wheel body. In this shearing operation by forming the spokes of increasing width close to the hub and to the rim, I am enabled to produce a wheel having much greater stiffness than in a wheel having a very thin continuous web portion, and am also enabled to distribute the load brought upon the hub through such relatively thick wide spoke portions to the rim, enabling the mid-portion of the wheel to sustain the entire load required. The wheels can be rapidly produced and at relatively low cost.

What I claim is:

1. The herein described method of forming forged steel wheels, consisting in forging a finished wheel body with an integral hub portion, a flat web portion of the same thickness at equal distances from the wheel axis and a rim portion, and simultaneously shearing through said web portion at different points along lines parallel to the axis of the wheel to produce spoked portions connecting the hub and rim.

2. The herein described method of forming forged steel wheels, consisting in forging a finished wheel body with an integral hub portion, a flat web portion of the same thickness at equal distances from the wheel axis and a rim portion, and while the wheel is still in heated condition shearing through said web portion simultaneously at different points along lines parallel to the axis of the wheel to produce spoked portions connecting the hub and rim.

3. The herein described method of forming forged steel wheels, consisting in forging a finished wheel body and an internal hub portion, web portion and rim portion, the web portion being dished and of the same thickness at equal distances from the wheel axis, and shearing through said web portion simultaneously at different points progressively from adjacent the rim toward the hub along lines parallel to the axis of the wheel to produce spoke portions connecting the hub and rim.

4. The herein described method of forming forged steel wheels, consisting in forging a finished wheel body with hub portion, rim portion and continuous connecting web portion, clamping said wheel between suitable dies and while so held shearing through said web portion progressively on radial lines parallel to the axis of the wheel to produce spoke portions connecting the hub and rim.

5. The herein described method of forming forged steel wheels, consisting in forging a finished wheel body with hub and rim, and a continuous connecting web portion, confining the rim portion of said wheel and while so confined shearing through said web portion progressively on radial lines to produce spoke portions connecting the hub and rim.

6. The herein described method of forming forged steel wheels consisting in forging the wheel blank to finished shape, and during the same heat clamping the finished wheel in a set of dies of like shape and shearing the web portion of the blank while so clamped simultaneously at different points, and progressively from the rim toward the hub on lines parallel to the axis of the wheel to form a spoked wheel.

7. The herein described method of forming forged steel wheels consisting in forging the wheel blank to finished and dished shape, clamping the finished wheel between dies of like shape and while so clamped shearing the web at different points simultaneously and progressively from the rim toward the hub to form a spoked wheel.

In testimony whereof, I the said JOHN M. HANSEN, have hereunto set my hand.

JOHN M. HANSEN.

Witnesses:
ROBERT C. TOTTEN,
JOHN F. WILL.

Copies of this patent may be obtained for five cents each, by addressing the "Commissioner of Patents, Washington, D. C."